Figure 1:
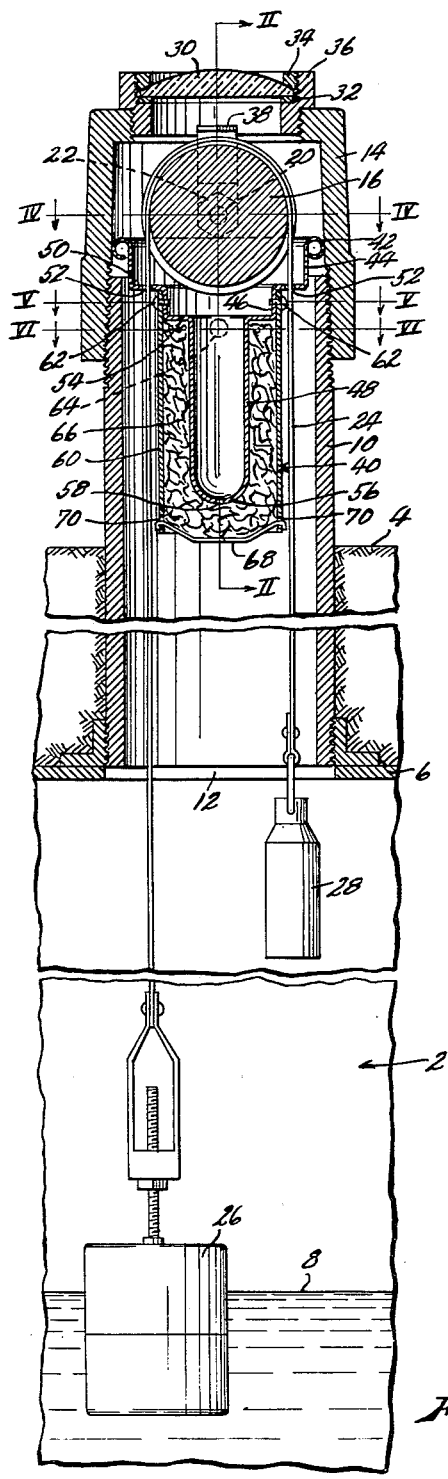

May 7, 1963 I. W. STEIL 3,088,318
LIQUID LEVEL GAUGE FOR UNDERGROUND TANKS
Filed Dec. 11, 1961 2 Sheets-Sheet 1

INVENTOR.
Irvin W. Steil
BY John A. Hamilton
Attorney.

May 7, 1963 I. W. STEIL 3,088,318
LIQUID LEVEL GAUGE FOR UNDERGROUND TANKS
Filed Dec. 11, 1961 2 Sheets-Sheet 2

INVENTOR.
Irvin W. Steil
BY John A. Hamilton
Attorney.

United States Patent Office 3,088,318
Patented May 7, 1963

3,088,318
LIQUID LEVEL GAUGE FOR UNDER-
GROUND TANKS
Irvin W. Steil, 4622 Forest, Kansas City, Mo.
Filed Dec. 11, 1961, Ser. No. 158,468
6 Claims. (Cl. 73—321)

This invention relates to new and useful improvements in liquid level gauges, and is an improvement over the gauge shown in my Patent No. 2,852,938, issued September 23, 1958.

The invention relates particularly to gauges of the sealed type which are used for indicating the liquid level in underground tanks. Such gauges commonly employ an above-ground chamber in communication with the tank, and having a window therein through which gauge members within the chamber may be observed. Since the gauge members must extend into the tank, there is necessarily an air passage between the chamber and the tank, and as a result all previous gauges of this type within my knowledge have been subject to the serious disadvantage that during cold weather there is established a convection current of relatively warm, moisture laden air from the tank to the above-ground chamber, where moisture is condensed therefrom. Not only would this condensation cause fogging or frosting of the viewing window so as to render reading of the gauge difficult or impossible, but also the condensation might freeze and immobilize working parts of the gauge itself, and render it totally inoperable.

The principal object of the present invention is, therefore, the provision of a gauge of the general class described having novel means for preventing condensation in the above-ground gauge chamber. Generally, this object is accomplished by means of a condenser interposed between the tank and the above-ground gauge chamber, and operable to dehydrate the warm, moist air rising from the tank before it reaches the chamber, so that the air actually reaching the chamber is sufficiently dry to avoid condensation of moisture therefrom. The gauge shown in my prior patent was efficient under most circumstances, but was found to permit condensation in the gauge chamber under conditions of extreme cold, which of course increases the temperature differential between the tank and the gauge chamber. The principal object of the present application is therefore the provision of a novel construction which increases the efficiency of the gauge to prevent condensation under these extreme conditions.

Other objects are efficiency and dependability of operation, economy and simplicity of construction, and adaptability of the inventive principles involved for use in various types of instruments.

Figure 2:
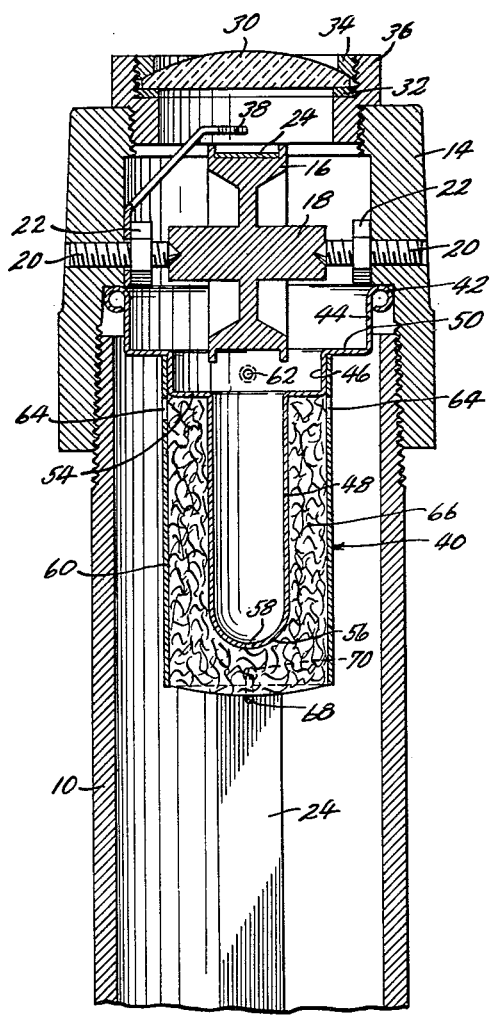
Figure 3:
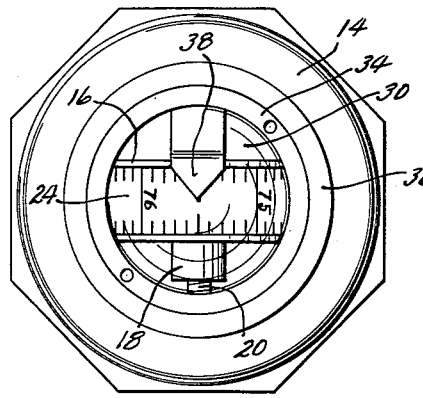
Figure 4:
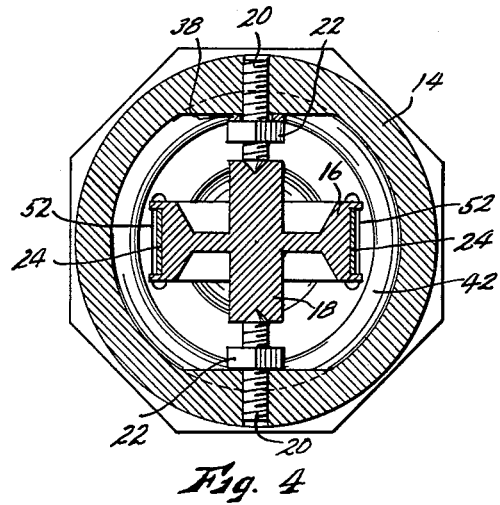
Figure 5:
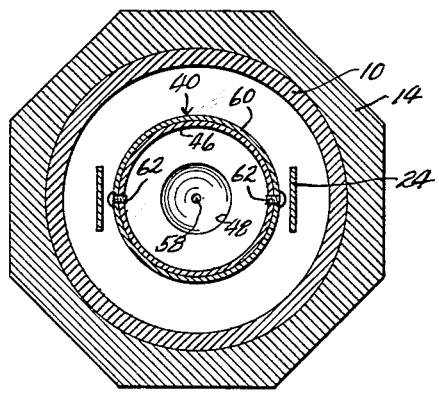
Figure 6:
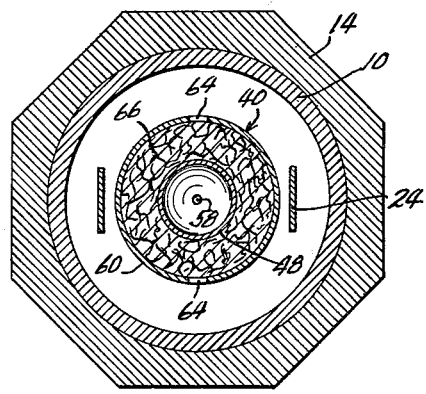

With these objects in view, as well as other objects which will appear in the course of the specification, reference will be had to the accompanying drawing, wherein:

FIG. 1 is a foreshortened vertical sectional view of a liquid level gauge embodying the present invention, FIG. 2 is an enlarged fragmentary sectional view taken on line II—II of FIG. 1, FIG. 3 is an enlarged top plan view of the gauge as shown in FIG. 1, and FIGS. 4, 5 and 6 are enlarged sectional views taken respectively on lines IV—IV, V—V and VI—VI of FIG. 1.

Like reference numerals apply to similar parts throughout the several views, and the numeral 2 applies to a tank buried underground, the ground level being indicated at 4, the top wall of the tank being indicated at 6, and the liquid level in the tank being indicated at 8. A vertical pipe 10 is fitted at its lower end into a top opening 12 of the tank, and extends upwardly above ground level 4, as shown. The upper end of said pipe is closed by a screw cap 14 of inverted cup shape, which also constitutes the gauge housing.

Mounted within said housing for rotation on a horizontal axis is a flanged pulley 16. The hub 18 of said pulley is engaged respectively at its opposite ends by the confronting conical ends of a pair of screws 20, said screws being coaxial and threaded into the wall of cap 14 at diametrically opposite points. Said screws are adjustable to take up wear in the pulley bearings, and each screw is secured by a lock nut 22. Trained over pulley 16 is a flexible tape 24 on which suitable indicia is imprinted, as shown in FIG. 3. Both ends of said tape hang freely downwardly through pipe 10 into tank 2. Attached to one end of said tape is a buoyant float 26 which floats at the liquid level 8 of the tank. Attached to the other end of the tape is a counterweight 28 which is sufficiently heavy to maintain the tape taut, but which is lighter than float 26.

With the gauge arranged as shown in FIG. 1, it will be seen that the liquid level in the tank may be observed by reading the indicia on tape 24 at the point it passes over pulley 16. The tape is viewed through a window in the upper end of the housing cap 14 said window constituting a magnifying glass 30 secured between a gasket 32 and clamp ring 34 in a mounting ring 36 threaded into cap 14. Accurate reading of the tape is assisted by an indicator finger 38 having the pointer end thereof disposed above the pulley, and having its opposite end clamped between one of lock nuts 22 and the wall of cap 14. The tape obviously may be calibrated either in gallons or other units of volume, or in inches or other linear units. In the latter case the gauge would be used in conjunction with a chart on which the tank contents in units of volume is charted against the tape readings. In this manner, by using different charts, one tape could be used in any tank.

With the gauge thus far described, the usual occurrence in cold weather has been that the relatively warm, moist air in the tank would rise through pipe 10, being lighter than the cold air within the pipe above ground level, and into cap 14, which is of course maintained cold by the surrounding atmosphere. After being cooled, the air would flow downwardly through the pipe into the tank. The convection current thus established constituted a rising column of warm air in the central or axial portion of the pipe, and a descending sheath of cool air directly adjacent the pipe walls. The cooling of the air in cap 14, if sufficient to lower the temperature thereof below the dew point, produced condensation within cap 14. This condensate would fog or frost the glass 30 so that the gauge cannot be read, or may freeze the tape 24 to pulley 16, rendering the gauge inoperative.

The present invention contemplates the additional usage of an improved condenser indicated generally by the numeral 40 and disposed in the lower portion of cap 14 and the upper portion of pipe 10. It is generally circular and cup-shaped with its axis coaxial with pipe 10, and is formed of a thin sheet metal having a high heat conductivity, such as aluminum, though other materials could be used if desired. It is provided at its upper end with a rolled bead 42 fitted tightly into cap 14, intimately engaging the inner surface of the cap wall just below screws 20. Below bead 42, the condenser is provided with three concentric cylindrical portions 44, 46 and 48 of successively reduced diameters. Portions 44 and 46 are connected by an annular flange 50, and are respectively of diameters greater than and smaller than the diameter of pulley 16, and the reaches of tape 24 depend respectively through a pair of slots 52 formed at diametrically opposite points in flange 50. Cylindrical portions 46 and 48 are joined by a horizontal annular flange 54. Cylindrical portion 48 is of substantial vertical length, is open at its upper end, and is closed at its lower end by a hemispherical portion 56 having a small hole 58 formed therethrough at its lowermost point. The portion of the condenser thus far described constitutes a closure member which substantially closes the bottom of cap 14. The condenser also includes a cylindrical tube 60, also preferably formed of aluminum, the upper end portion of said tube engaging snugly about cylindrical portion 46 of the condenser and being affixed thereto by screws 62. Said tube extends below hemispherical portion 56 of the condenser. A pair of holes 64 are formed in tube 60 at diametrically opposite points and adjacent the upper end thereof, just below the level of flange 54. Said holes are disposed ninety degrees out of angular registry with the tape slots 52 of flange 50, for a purpose which will presently appear. The space between tube 60 and cylindrical portion 48 of the condenser is filled loosely with long, loosely compacted strands of a highly heat conductive metal. This filling, indicated at 66, may conveniently be a loose pad of copper strands or shavings such as is commonly used as a kitchen scouring pad. Said filling is retained in place in tube 60 by a wire 68 extending across the lower end of the tube and inserted in holes 70 formed in the wall of said tube.

It will be seen that in operation the relatively warm, moisture laden air rising from tank 2 through pipe 10, since it tends to rise in an axial column spaced apart from the pipe wall, enters the lower end of tube 60 and rises through said tube. In so doing, it transfers its heat to tube 60, filling 66, and to the external surface of cylindrical portion 48 of the condenser, and is cooled thereby. Heat transferred to these elements is conducted through the condenser to bead 42 thereof and thence to cap 14, from whence it is dissipated in the atmosphere. Condenser portion 48 is also cooled by convection currents set up in the gauge chamber above the condenser. Since the air rising through tube 60 is thus cooled below its dew point, moisture is condensed therefrom and deposited on members 48, 60 and 66. Extensive tests show that even in conditions of extreme atmospheric coldness, virtually all of the moisture condensate or frost will form on the lower portion of cylindrical portion 48 and the adjacent portions of tube 60 and filling 66, and will reach the upper portions of these parts in a sufficiently dry condition that no further condensation therefrom will occur under any normal conditions. The rising current of air then leaves tube 60 through holes 64 into the annular space between said tube and pipe 10, and since it is then cooler and heavier, it descends through said pipe into tank 2. If under extreme conditions the air passing through holes 64 is still sufficiently warm to continue rising, it is cooled by direct contact with the pipe wall before it can pass upwardly through tape slots 52. This is the purpose of placing holes 64 out of angular registry with slots 52.

Hole 58 provides for drainage from the condenser of any condensate which may form therein. It is, however, sufficiently small that the volume of air passing upwardly therethrough will not be sufficient to negative the action of the condenser. Any moisture in this air will be immediately condensed in the power portion of the condenser, and will not reach the zone of pulley 16 or glass 30.

The end result of the improved condenser shown is that any air entering the cap 14 through tape slots 52 will be sufficiently cooled, and hence dried, that substantially no condensation occurs in said cap. The device shown in my prior patent differed from that shown here principally in that it did not include tube 60 or filling 66. These elements have been found to greatly increase the efficiency of the condenser. While my prior device was thoroughly operative and efficient under most conditions, it nevertheless permitted condensation in the gauge chamber under unusual conditions of extreme or prolonged cold weather. The present device has been extensively and exhaustively tested, and will prevent condensation under virtually any possible conditions.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A liquid level gauge for use in connection with an underground tank having a pipe interconnected therewith and extending above ground level, said gauge comprising:
   a. a housing closing and sealing the upper end of said pipe and having a transparent window therein,
   b. gauge members supported in said housing, being readable through said window and including a member depending downwardly through said pipe into said tank and movable responsively to the liquid level therein, and
   c. a moisture condenser comprising:
      (1) a heat conducting closure member contacting said housing and closing the lower end thereof, said closure member having a restricted hole formed therethrough through which said depending gauge member is trained,
      (2) a heat conducting tubular member affixed to said closure member and depending therefrom, said tubular member being open at its lower end and having holes formed therein adjacent its upper end but below said closure member, and
      (3) a filling of highly porous heat conducting material in said tubular member.

2. A liquid level gauge as recited in claim 1 wherein said tubular member is disposed coaxially with said housing and pipe, and is of smaller diameter than said pipe.

3. A liquid level gauge as recited in claim 1 wherein said holes in said tubular member are disposed out of registry with said hole in said closure member.

4. A liquid level gauge as recited in claim 1 wherein said closure member includes a cylindrical portion depending within said tubular member but of smaller diameter than said tubular member whereby to form an annular space therebetween, said filling occupying said annular space, said cylindrical closure portion opening at its upper end above said closure member.

5. A liquid level gauge as recited in claim 1 wherein said gauge members comprise a pulley mounted in said housing for rotation on a horizontal axis, a flexible tape trained over said pulley and having its end portions depending through said pipe into said tank, and a float and counterweight secured respectively to the ends of said tape, and wherein said closure member has a pair of restricted holes formed therethrough through which the depending reaches of said tape are respectively trained.

6. A liquid level gauge as recited in claim 1 wherein said gauge members comprise a pulley mounted in said housing for rotation on a horizontal axis, a flexible tape trained over said pulley and having its end portions depending through said pipe into said tank, and a float and counterweight secured respectively to the ends of said tape, and wherein said closure member constitutes a cup shaped member having top, intermediate and bottom concentric cylindrical sections of successively reduced diameters, said top section being of larger diameter than said pulley and being connected to said intermediate section by a first annular flange, said intermediate section being of smaller diameter than said pulley and connected to said bottom section by a second annular flange, said first annular flange having restricted slots formed therethrough through which the depending reaches of said tape are trained, said tubular member fitting about said intermediate section and depending therefrom, and said bottom closure section depending within said tubular member, said filling occupying the annular space between said tubular member and said bottom closure section.

No references cited.